Nov. 26, 1929. W. A. FINNEGAN Re. 17,505

HOLDER FOR CHRISTMAS TREES, ETC

Original Filed April 25, 1928

Inventor
Wilfred A. Finnegan
by Wright Brown Quinby & May
Attys.

Reissued Nov. 26, 1929 Re. 17,505

UNITED STATES PATENT OFFICE

WILFRED A. FINNEGAN, OF BANGOR, MAINE

HOLDER FOR CHRISTMAS TREES, ETC.

Original No. 1,706,223, dated March 19, 1929, Serial No. 272,737, filed April 25, 1928. Application for reissue filed May 27, 1929. Serial No. 366,386.

This invention relates to a holder adapted to have an extended bearing on a horizontal support, such as a floor, and including a central socket which is perpendicular to the support, and adapted to receive the lower end portion of an upright article, such as the trunk of a Christmas tree.

The object of the invention is to provide a knockdown holder composed entirely of four duplicate members, each so formed that it may be separably interlocked with another member in such manner that the several members may be assembled to form a socket and brace portions extending outwardly in different directions therefrom, to afford a stable support for an upright article inserted in the socket, the members being readily separable from each other, so that the holder may be quickly erected for use and knocked down for storage and shipment.

Of the accompanying drawings forming a part of this specification,—

The same reference characters indicate the same parts in all of the figures.

My improved holder is composed entirely of four duplicate oblong members 12, which may be conveniently sawed, or otherwise cut from flat-sided wooden boards, the inner end portion of each member being preferably widened, and constituting a side wall of a socket adapted to receive and laterally support an upright article.

On the inner end of each arm is integrally formed a tenon 13, here shown as a dovetail tongue, extending from edge to edge of the member. In one side of the inner end portion of each member is formed a pocket 14, here shown as a dovetail groove, adapted to receive and be separably interlocked with the tenon 13 of another member, the tenon and pocket extending crosswise of the member and being perpendicular to a floor on which the holder bears when in use.

The arrangement is such that the tenons and pockets of the several members may be interlocked to form a holder adapted to have an extended bearing on a floor, and including a central four-sided socket 15, perpendicular to a floor on which the holder rests, and brace portions projecting outwardly in different directions from the corner portions of the socket.

Figure 1:
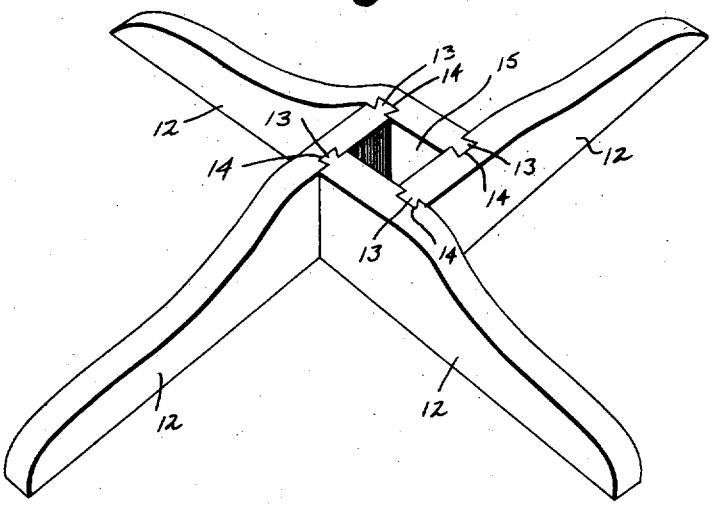
Figure 1 is a perspective view, showing the holder erected for use.
Figure 2:
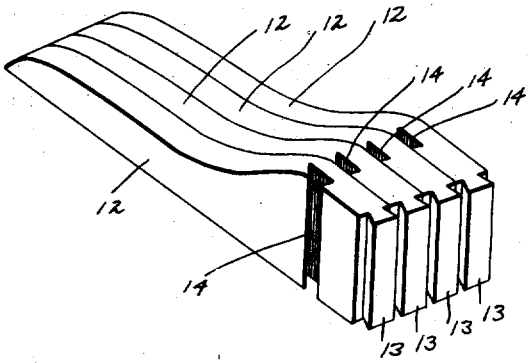
Figure 2 is a perspective view, showing the holder knocked down.

The tenons are slidable into and out of the pockets, so that the holder may be quickly erected, as shown by Figure 1, and knocked down and compactly packed, as shown by Figure 2, for storage and shipment.

When a Christmas tree trunk, or other member to be supported, is inserted in the socket, any tendency of said member to be inclined from a vertical position, causes the contacting faces of the tenons and pockets to bind on each other, so that endwise slipping of the pocket faces on the tenon faces is prevented. It is therefore unnecessary to provide means, such as screws, for positively connecting the members to each other.

It will be seen that the pocket 14 of each member is located between a relatively short socket wall portion of the member, and a longer brace portion thereof, the tenon 13 being on the extremity of the socket wall portion.

I claim:

A socketed and braced holder composed of a plurality of duplicate oblong members, each having a tenon at one end and in one side a pocket located between a relatively short socket wall portion and a longer brace portion of said member, the tenons and pockets being slidably interengaged and vertically arranged when the holder is in use, the arrangement being such that any inclination of a supported article from a vertical position causes the contacting faces of the tenons and pockets to bind on each other and prevent slipping of the pocket faces on the tenon faces, so that the holder is maintained in an operative condition, under all conditions of use, the tenons being freely slidable out of the pockets when no binding pressure is exerted thereon.

In testimony whereof, I have affixed my signature.

WILFRED A. FINNEGAN.